United States Patent [19]

Jirka

[11] 3,936,869
[45] Feb. 3, 1976

[54] AUTOMATIC COLOR LEVEL CIRCUIT WITH PEAK DETECTOR

[75] Inventor: Howard F. Jirka, Mount Prospect, Ill.

[73] Assignee: Zenith Radio Corporation, Chicago, Ill.

[22] Filed: Nov. 2, 1973

[21] Appl. No.: 412,220

[52] U.S. Cl. ..................... 358/27; 325/410; 330/29
[51] Int. Cl.² ............................................ H04N 9/535
[58] Field of Search ................... 358/27; 307/235 A; 328/151; 330/29; 325/401, 410, 411, 412

[56] References Cited
UNITED STATES PATENTS

| | | | |
|---|---|---|---|
| 3,281,686 | 10/1966 | Cochran | 328/151 X |
| 3,740,462 | 6/1973 | Harwood | 358/27 |
| 3,764,734 | 10/1973 | Srivastava et al. | 358/27 |

*Primary Examiner*—Robert L. Griffin
*Assistant Examiner*—Mitchell Saffian
*Attorney, Agent, or Firm*—Nicholas A. Camasto

[57] ABSTRACT

A color television receiver includes an automatic chroma control (ACC) system and a switch selectable manual color level potentiometer and a closed loop automatic color level limiter (ACL) with a preset color level potentiometer. The ACL loop is of the sample-and-hold type and includes a peak detector for detecting chroma signals in excess of a predetermined threshold level and a transistor for controlling the preset color level potentiometer for adjustment of the chroma amplifier gain. A relatively small capacitor is connected across the collector and base of the transistor and, in conjunction with a bias resistor, presents a relatively long time constant by reflecting a magnified input capacitance between its base and emitter electrodes due to the Miller effect. In the event the transistor is driven to cutoff during periods when the switch is in the manual position, the input capacitance is very small enabling the ACL circuit to recover quickly.

7 Claims, 2 Drawing Figures

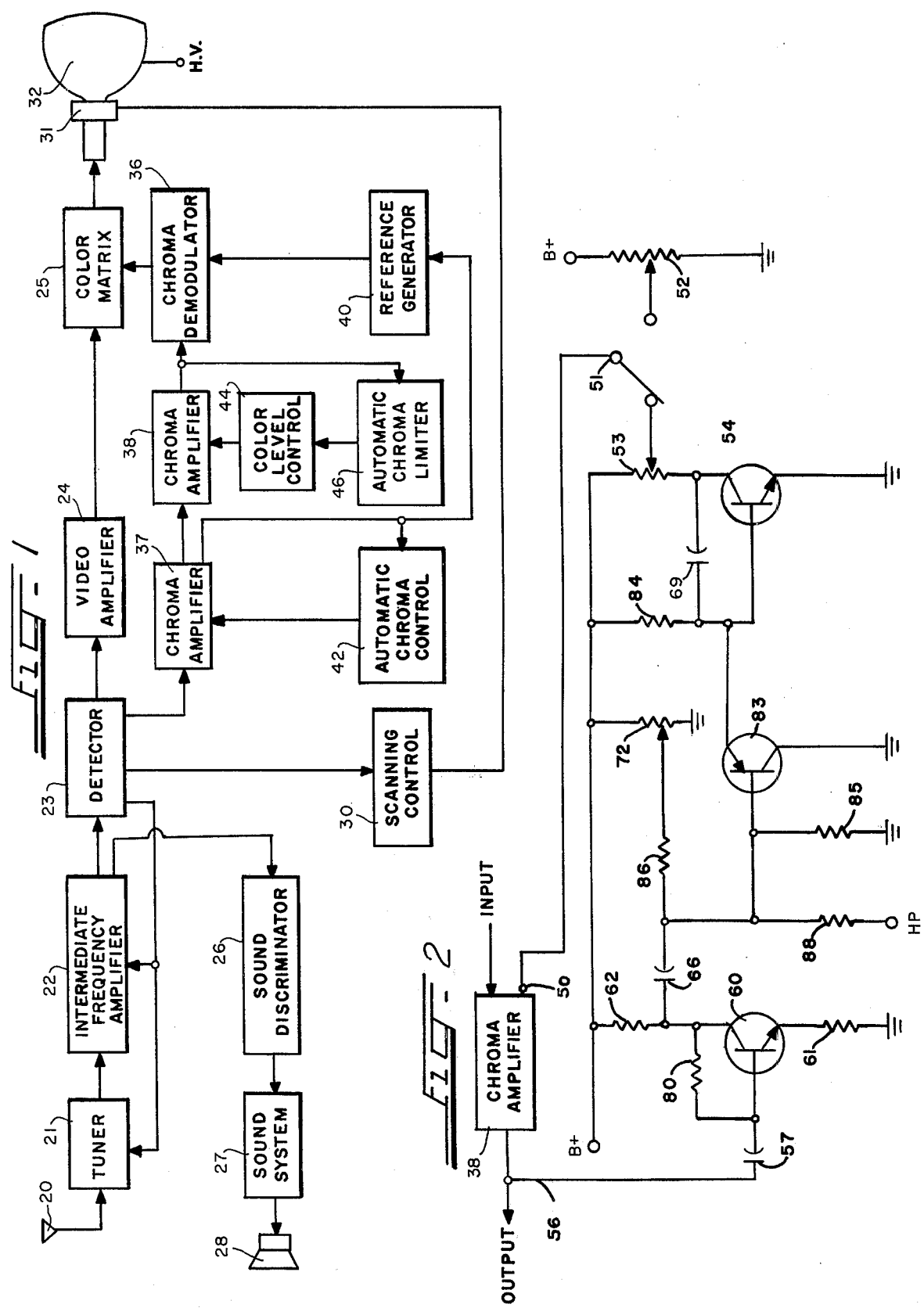

AUTOMATIC COLOR LEVEL CIRCUIT WITH PEAK DETECTOR

RELATED PATENT APPLICATIONS

This application is related to abandoned application Ser. No. 347,932 filed Apr. 4, 1973 entitled AUTOMATIC COLOR LEVEL CIRCUIT in the names of Charles H. Heuer and Howard F. Jirka, and assigned to the assignee of the present invention.

BACKGROUND OF THE INVENTION

The present invention pertains to automatic chroma circuits in color television receivers. More particularly, it relates to a sample-and-hold circuit with quick recovery time especially adapted for use in automatic chroma circuits.

Most color television receivers include automatic control systems for achieving stability of operation and fidelity of reproduction in the presence of variations in the received television signal. For example, the well-known automatic gain control (AGC) responds to the amplitude of the video carrier to develop a control signal for the preceding turner and intermediate-frequency amplifier to maintain a constant carrier amplitude at the video detector. Many receivers also have an automatic frequency control (AFC) for correcting any deviation in the video IF carrier from its design-center value. It is also very common to include another automatic frequency control for maintaining synchronization of the horizontal scanning circuits with the horizontal synchronizing pulses in the received television signal.

Color receivers also include means for synchronizing the receiver regenerated color reference subcarrier with the transmitted 3.58 megahertz color burst signal for faithful reproduction of the hue (tinting) in the video display. Another conventional form of automatic control in color receivers is that called automatic chroma or color control (ACC). Here, the gain of the chroma amplifier is varied to maintain the amplitude of the burst signal constant and a viewer adjustable control is provided for adjusting the chroma gain to achieve an average desired color level in the reproduced picture to his own preference.

In spite of the many control circuits mentioned, inconsistency in chroma content of the reproduced image persists, because the chroma content or color level of the picture is not consistently related to the burst amplitude. The difficulty is particularly evident when the receiver is of the recently introduced, and well accepted, type which includes a switch for selecting preset factory adjustments of different parameters in preference to the manual controls. That is, the receivers include a number of normally viewer-inaccessible controls which are preset to obtain a technically optimum display. The viewer may, of course, use the manual controls by operating the switch. Because of the inconsistent relationship of the chroma content and color burst, however, even the factory set color level control adjustment is unable to give satisfactory results for the wide variety of color levels encountered.

In the above-mentioned abandoned application, a television receiver is provided with a preset/manual switch and an automatic color level limiter which comprises a sample-and-hold circuit arrangement in a closed loop including the chroma amplifier. The circuit arrangement includes a peak detector for detecting color signals in excess of a predetermined threshold and means producing compensatory gain adjustments on the chroma amplifier over a relatively long time interval. Effectively, the ACL system produces correction information based upon above-threshold peaks in color level, the information being updated by subsequent peaks. The ACL loop contains a transistor controlled preset color level potentiometer. The transistor is normally operated near saturation and, because of the closed loop, could not be driven to cutoff.

With the receiver operated with the manual/preset switch in the manual position, however, the ACL closed loop is open and the transistor can be driven beyond cutoff. Subsequently switching to preset operation often resulted in a long recovery time before the ACL loop regained control. The preferred embodiment disclosed a Miller effect capacitor coupled across the collector and base of the transistor for overcoming this problem, which is the subject of this application. Because of this interrelationship abandoned application Ser. No. 347,932 filed Apr. 4, 1973 in the names of Charles H. Heuer and Howard F. Jirka is hereby incorporated by reference in the present application.

SUMMARY OF THE INVENTION

The invention includes the combination of means for amplifying signals subject to substantial amplitude variations and a closed loop sample-and-hold control system including peak detector means for detecting portions of the signals in excess of a predetermined threshold level for producing a compensatory control potential to adjust the gain of the amplifying means. The control means include a transistor normally operated near saturation but which is subject to cutoff, and means whereby the transistor presents a relatively long time constant during conduction and a relatively short time constant during cutoff.

OBJECTS OF THE INVENTION

It is, accordingly, a general object of the present invention to provide an improved color television receiver.

Another object of the present invention is to provide an improved automatic chroma level limiter in a color television receiver.

A further object of this invention is to provide a novel sample-and-hold control system.

BRIEF DESCRIPTION OF THE DRAWINGS

The features of the invention which are believed to be novel are set forth with particularity in the appended claims. The invention, together with further objects and advantages thereof, may best be understood, however, by reference to the following description taken in conjunction with the accompanying drawings, in the several figures of which like reference numerals identify like elements, and in which:

FIG. 1 is a block diagram of a color television receiver of the type in which the invention will find ready application; and FIG. 2 is a schematic diagram illustrating the preferred embodiment of the invention in the automatic chroma limiter of FIG. 1.

DESCRIPTION OF THE PREFERRED EMBODIMENT

FIG. 1 is a simplified block diagram illustration of a conventional color television receiver. An antenna 20 supplies television signals to a tuner 21. Employing the usual superheterodyne technique, tuner 21 converts the signal frequencies in the channel range selected to a constant frequency range, and the converted signals are fed to an intermediate frequency (IF) amplifier 22. The amplified IF signals are coupled to a detector 23 which supplies the developed brightness or luminance video signal to a video amplifier 24. The latter, in turn, is fed to a color matrix 25.

A portion of the amplified IF signal from amplifier 22 also is fed to a sound discriminator 26 from which an audio signal is derived and amplified by a sound system 27 which supplies a sound reproducer 28. Also, a control signal proportional to the amplitude of the video carrier in the IF amplifier is developed by detector 23 and fed back to tuner 21 and IF amplifier 22 to provide AGC. Detector 23 also extracts synchronizing information from the IF signals for application to a scanning control 30 that, in turn, supplies a yoke assembly 31 mounted on the neck of a color cathode ray tube 32. Scanning control 30 includes means for producing and developing horizontal and vertical scanning waveforms for the deflection coils in yoke assembly 31 to create a raster on the faceplate of tube 32, as well as conventional dynamic convergence and other circuitry to assure proper beam landings on appropriate assigned phosphor areas on the color tube faceplate.

The receiver is also responsive to color-representative information in the television signal for developing controllably-amplified signals that are applied to a chroma demodulator 36. The circuitry includes a first chroma amplifier 37 and a second chroma amplifier 38. Amplifier 37 receives, from detector 23, color information that defines both the hue and the saturation in the image to be reproduced, and a color reference signal. The hue information represents the color, typically in the range of color from purple to green, being received at any moment. The saturation information represents the vividness of the color. For example, a pastel color has a low degree of saturation, whereas a deep or rich color has a high degree of saturation. The color reference signal is a burst or sample of the 3.58 megahertz subcarrier which is transmitted along with horizontal synchronizing information. The burst frequency and phase correspond to that of the subcarrier (suppressed) upon which the hue and saturation information are modulated and are transmitted to enable proper regeneration of the subcarrier in the receiver.

One function of chroma amplifier 37 is to supply the burst signal to a reference generator 40 which, in turn, supplies reference signals to chroma demodulator 36 for appropriate demodulation of the chroma signal from the output of chroma amplifier 38. Demodulator 36 produces three related, but distinct color-difference signals and supplies them to color matrix 25 which adds the luminance or brightness signal from video amplifier 24 to each color-difference signal. The resultant signals are fed to tube 32 to modulate the corresponding plurality of electron beams that respectively activate the red, green and blue phosphor areas.

As is well known, the function of color matrix 25 may be accomplished within the cathode ray tube itself. In that case, the luminance signals from the video amplifier are fed in common to the tube's three different cathodes, for example, while the color-difference signals are fed to respective ones of its control grids. Similarly, reference generator 40 may take any of a number of well-known forms. It may, for example, be a 3.58 megahertz oscillator, the frequency of which is controlled by comparison with the burst signal. Generator 40 may also be of the type wherein the subcarrier is regenerated by applying the burst signal to a crystal ringing circuit. In any case, the reference signals supplied to demodulator 36 must be of proper phase and frequency.

Also included in the receiver of FIG. 1 is an automatic chroma control 42. In a manner well known, ACC 42 senses variations in the amplitude of the burst signal at the output of chroma amplifier 37 and develops a compensatory control signal which is fed back to amplifier 37 to vary its gain to maintain the burst amplitude constant. Ideally, a constant chroma level is maintained regardless of variations in the different chroma signals (variations in the video carrier are compensated by the AGC system). The receiver also includes a color level control 44 which permits manual adjustment of the gain of chroma amplifier 38. Typically, the viewer selects a desired degree of color level or saturation by adjustment of control 44, after which the ACC circuit with the assistance of the AGC circuit, maintains the selected color level.

As thus far described, the receiver of FIG. 1 is entirely conventional, and will be understood to include the usual additional features that have been found to be desirable. For example manually-adjustable controls are provided for the viewer in the typical receiver so that he may selectively adjust such functions as audio volume and tone, and brightness, contrast, hue and saturation of the video display.

As previously mentioned, in accordance with the invention described and claimed in the above-mentioned related application, the receiver further includes an automatic chroma level limiter (ACL) 46 which receives a portion of the chroma signal from the output of chroma amplifier 38 and develops a control signal representative of its amplitude. Any change therein beyond a predetermined threshold is utilized by ACL 46 to effect a compensatory change in the gain of amplifier 38, by altering the control voltage of color level control potentiometer 44.

In FIG. 2, chroma amplifier 38 includes an input from chroma amplifier 37, an output connected to an input terminal 56 of an automatic chroma level limiter and a control terminal 50, connected to the wiper of a signal pole, double throw, viewer operable, manual/preset switch 51. Switch 51 determines whether the receiver is operating in a manual mode or in a preset mode, and in practice may comprise one of a plurality of switches arranged to select between numerous preset and manually operable functions. The manual color level control comprises an adjustable tap on a potentiometer 52 connected between a positive potential B+ and ground. The tap is connectable by the wiper of switch 51 to control terminal 50 of chroma amplifier 38, the gain of which is responsive to settings of the tap. Thus potentiometer 52 may be adjusted by the viewer to select a preferred chroma level in the video display. Alternatively, the wiper of switch 51 may be connected to the tap on a potentiometer 53 connected between B+ and the collector of a grounded emitter NPN transistor 54. It will be seen that potentiometers 52 and 53 and switch 51 may be considered, performance wise, to be included in the block 44 labelled Color Level Control in FIG. 1 whereas the circuitry from input terminal 56 to the collector of transistor 54 comprises the automatic chroma limiter 46.

Assuming for the moment that transistor 54 operates in a fixed conductive condition, such as saturation, adjustment of the tap on potentiometer 53 then serves simply as another or alternate color level control similar to potentiometer 52. Here, however, potentiometer 53 is adjusted or preset at the factory (or by a serviceman) to produce an optimum value of color level, and is generally inaccessible to the viewer. Depending upon the position of the wiper of switch 51, the receiver is in either the preset or manual mode. In the drawing, switch 51 is shown in the preset operating position and hence the receiver is in the preset operating mode.

A portion of the chroma signal appearing at the output of chroma amplifier 38 is fed to input terminal 56 of the automatic chroma limiter circuit. Terminal 56 of the ACL is coupled, by a capacitor 57 to the base of an NPN transistor 60, the emitter of which is returned to ground through a resistor 61 and the collector of which is connected to B+ through a resistor 62. A resistor 80 interconnects the collector of transistor 60 to its base for bias purposes. The amplified chroma signal at the collector of transistor 60 is fed, through a capacitor 66, to the base of an NPN transistor 83, the collector of which is connected to ground and the emitter of which is connected to the base of an NPN transistor 54. A bias resistor 84 is connected between B+ and the emitter of transistor 83, and its base is connected to ground through a resistor 85. A threshold potentiometer 72 is connected between B+ and ground and has a tap connected to the base of transistor 83 through a resistor 86. A horizontal rate pulse is supplied to a terminal HP and, through a resistor 88, to the base of transistor 83. The signal appearing at the emitter of transistor 83 is directly coupled to the base of transistor 54. A Miller effect capacitor 69 is connected between the collector and base of grounded emitter transistor 54. As stated, potentiometer 53 forms the collector load for transistor 54 and the tap on potentiometer 53 connects to switch 51 for supplying control voltage to terminal 50 on amplifier 38.

As will be seen, the above circuitry establishes a sample-and-hold automatic color level limiter system. Potentiometer 72 establishes a threshold bias on transistor 83. The horizontal rate pulses at terminal HP ready transistor 83 for conduction only during occurrence of peaks of chroma signal over the threshold which is set to keep transistor 83 cut off for chroma signals of low amplitude. The B+ connection through resistor 84 to the base of transistor 54 (and its grounded emitter) results in this transistor being in saturation under small signal conditions, that is, when transistor 83 is cut off. Upon conduction of transistor 83 on above-threshold peaks of the chroma signals, transistor 54 comes out of saturation and its collector potential rises toward B+ to produce an appropriate control potential change at the wiper of potentiometer 53. This control potential is fed back to chroma amplifier 38 for reducing its gain. It will be seen that because of the closed loop, transistor 54 can never achieve a cutoff condition.

Capacitor 69 is approximately 0.5 microfarads, but because of the well-known Miller effect appears as a capacitor of approximately 100 microfarads (0.5 microfarads multiplied by 200, — the gain of transistor 54) connected from its base to ground. Consequently, in conjunction with resistor 84, it presents a long time constant. Any conduction in transistor 83 thus results in the application of an appropriate control potential for a relatively long time because of the long time constant presented by the input of transistor 54. Thus the sample-and-hold action is obtained. The long time constant is selected to insure that abrupt variations in chroma level do not occur, which would prove annoying to the viewer.

When switch 51 is in the manual position, namely, with its wiper contacting the movable tap on potentiometer 52, it is possible under certain signal conditions and manual control settings to drive transistor 54 well beyond cutoff because the control loop is open. However, when transistor 54 is cut off, the Miller effect is absent and, consequently, its input capacitance is small (about 0.5 microfarad). Thus the ACL circuit is capable of immediately responding to compensate for high chroma level signals in the event switch 51 is moved to the preset position. Thus utilizing Miller effect capacitor 69 enables a long-operating time constant and a very short cutoff time constant for transistor 54, and hence, for the control system.

While a particular embodiment of the present invention has been shown and described, it will be obvious to those skilled in the art that various changes and modifications may be made without departing from the invention in its broader aspects. Accordingly, the aim in the appended claims is to cover all such changes and modifications that may fall within the true spirit and scope of the invention.

What is claimed is:

1. In combination: a source of signals subject to a substantial range of amplitude variation; means for amplifying said signals; sample-and-hold control means, including peak detector means, detecting portions of said signals having amplitudes exceeding a predetermined threshold level and supplying a control potential to said amplifying means for producing a compensating gain adjustment, said control means including a transistor normally operated near saturation but being subject to cutoff, said transistor presenting a relatively long time constant during conduction and a short time constant during cutoff.

2. The combination set forth in claim 1, wherein said control means is in a closed feedback loop with said amplifying means and said transistor is precluded from cutoff during operation, said combination further including an alternately selectable external source of control potential for said amplifying means activated by breaking said feedback loop.

3. The combination as set forth in claim 2, wherein said transistor has an input circuit presenting a large effective input capacitance to said peak detector means for producing said relatively long time constant.

4. The combination as set forth in claim 3, wherein said transistor includes a capacitor between its base and collector electrodes and presents said large effective input capacitance between its base and emitter electrodes because of the Miller effect.

5. A color television receiver including means for developing a chroma signal subject to amplitude variations, chroma signal amplifying means, and mutually exclusive viewer-selectable manual and preset control for adjusting the gain of said amplifying means; an automatic chroma level limiter comprising: sample-and-hold means for detecting chroma signals having amplitudes in excess of a predetermined threshold and developing a compensatory control potential for said amplifying means; said sample-and-hold means including a transistor normally operable near its saturation condition but being subject to cutoff when said manual control is effective, and circuit means establishing a long time constant for said sample-and-hold means during normal operating of said transistor and a short time constant during cutoff of said transistor.

6. The combination as set forth in claim 5, wherein said circuit means present a large effective input capacitance for said transistor during conduction and a small effective input capacitance during cutoff.

7. The combination as set forth in claim 6, wherein said circuit means comprise a Miller effect capacitor connected to the collector and base electrodes of said transistor.

* * * * *